United States Patent [19]

Horn

[11] Patent Number: 4,573,369
[45] Date of Patent: Mar. 4, 1986

[54] LINEAR DRIVE

[76] Inventor: Hans Horn, Postgasse 46, 3011 Bern, Switzerland

[21] Appl. No.: 534,131

[22] Filed: Sep. 20, 1983

[30] Foreign Application Priority Data

Sep. 20, 1982 [CH] Switzerland ............... 5522/82
Mar. 22, 1983 [DE] Fed. Rep. of Germany ....... 3310304

[51] Int. Cl.$^4$ ............................................. F16H 21/44
[52] U.S. Cl. ..................................................... 74/110
[58] Field of Search .......................................... 74/110

[56] References Cited

U.S. PATENT DOCUMENTS

| | | | |
|---|---|---|---|
| 2,165,985 | 7/1939 | Schwentler | 74/110 X |
| 2,351,049 | 6/1944 | Kaman | 74/110 X |
| 2,732,723 | 1/1956 | Crofton | 74/110 |
| 2,914,955 | 12/1959 | Colborne et al. | 74/110 |
| 3,093,121 | 6/1963 | Murphy | 74/110 X |
| 3,200,656 | 8/1965 | Baskett | 74/110 X |
| 3,204,208 | 8/1965 | Lyman et al. | 74/110 X |

*Primary Examiner*—William E. Tapolcai
*Attorney, Agent, or Firm*—McGlew and Tuttle

[57] ABSTRACT

A linear drive has a pneumatic or hydraulic actuator cylinder, whose piston rod is fixed in place and whose moving, axially guided cylinder forms a supporting and driving part of a stroke ratio changing transmission for transmitting the relative motion between the cylinder and its axial guide to a linearly moving drive output member. A useful effect is produced by having the output member (1) guided on the outside on a slotted tube, a driving spur of the member (1) running in the slot in the tube and being fixed to the stroke ratio changing transmission that is inside. The tube placed round the cylinder is used for axially guiding the cylinder. The stroke ratio changing transmission is for example in the form of two pulleys mounted on the cylinder and a cord trained over them, the cord being fixed to the member and joined to the tube by a mounting arrangement.

19 Claims, 9 Drawing Figures

_{}_{}_{}_{}_{}_{}

LINEAR DRIVE

FIELD AND BACKGROUND OF THE INVENTION

The invention relates to a linear drive with a pneumatic, hydraulic or electric actuator cylinder, whose piston rod is fixed in position, and whose moving cylinder, that is guided in the lengthways direction, forms a supporting and driving part of a stroke ratio changing transmission. The transmission changes the ratio of the relative motion between the cylinder and its lengthways guide means and transmits it to a linearly moving drive output member.

In a prior art linear drive the drive output member is moved by pneumatic, hydraulic or electrical power. The driving effect is produced by an actuator cylinder that is fixed to the housing of the linear drive. A stroke ratio changing transmission is joined with the end of the moving piston rod, such transmission causing the drive output member to be moved with twice the stroke of the piston. In this design the known idea on which the stroke ratio changing effect is based is that of using two driven toothed belts, placed at the sides of the piston rod so that they are on the one hand fixed to the housing and on the other to the drive output member, such belts running over two pairs of pulleys that are fixedly joined together by pulley support means coupled with the piston rod of the cylinder. Placing the stroke ratio changing transmission on the moving piston rod makes for a complex design that takes up much space to make certain that there are no sideways forces or moments acting on the piston rod, more specially when it has been moved outwards, such forces otherwise being likely to be the cause of the piston rod jamming, for example.

This condition exists in the known, complex design noted here in that there are two pulley-supports placed symmetrically in relation to the axis of the piston rod so that the resultant force produced from the separate forces takes effect in the direction of the piston rod axis.

SUMMARY OF THE INVENTION

The purpose of the present invention is that of designing a very simple and space saving system for a pneumatic, hydraulic or electric linear drive by uniting an actuator cylinder and a stroke ratio changing transmission to take the form of an integral assembly with specially useful effects so that the linear drive is safeguarded against strong sideways forces and against dirt.

This is made possible in the present invention since as the parts responsible for changing the stroke ratio, and which are placed between the driven power output member and a fixed reference point of the transmission, are fixed to the moving actuator cylinder, that is guided in the lengthways direction, in such a way that the cylinder itself becomes the supporting and driving part of the transmission, the piston rod of the cylinder being kept fixed in position.

Forces coming from the stroke ratio changing transmission, that take effect as moments on the cylinder, are taken up by the lengthways guiding means for the cylinder or the bearings thereof at the ends of the cylinder.

In keeping with a further part of the invention, a slotted hollow section is provided, on the outside of which the drive output member is supported for linear motion and is joined with the stroke ratio changing transmission (running along inside the section) through the slot. If a safeguard against dirt is relatively more important, the slot may have a known guard rail or the like.

As a further part of the present invention the supporting hollow section, on which the size of the linear drive is more or less dependent, may be formed inside as a lengthways guide for the cylinder. If this is done compact designs may be produced.

In keeping with the invention the actuator cylinder, or furthermore for example turning parts of the transmission of a linear drive, may be used with known position sensing or speed controlling means.

An account will now be given of more specially useful working examples of the linear drive, as noted so far herein, using the figures.

BRIEF DESCRIPTION OF THE DRAWINGS

FIGS. 1 and 2 are sections taken on the line I—I of FIG. 3 in the two end positions of the actuator cylinder.

FIG. 3 is a section taken on the line III—III of FIG. 2.

FIG. 4 is a section taken on the line IV—IV of FIG. 5.

FIG. 5 is a section taken on the line V—V of FIG. 4.

DESCRIPTION OF THE PREFERRED EMBODIMENTS

Figure 1:
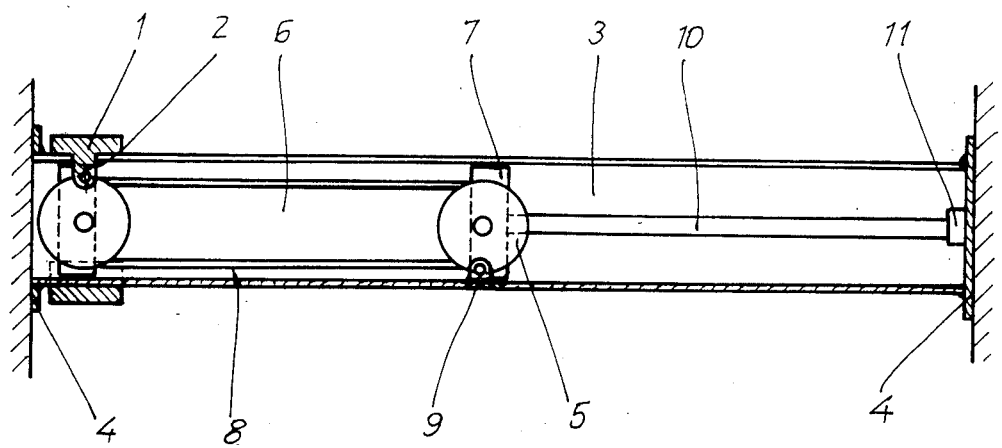
FIGS. 1 to 3 are diagrammatic views of a first working example of the linear drive with the piston rod fixed at one end.
Figure 2:
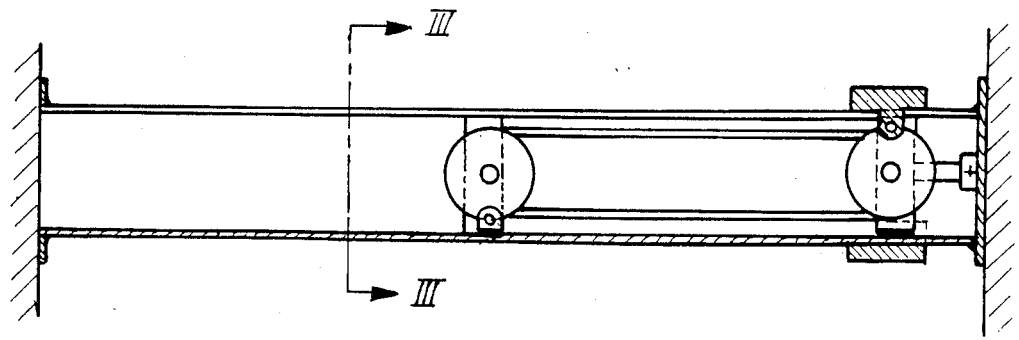

On firstly looking at FIGS. 1 and 2 it will be seen that the drive output member 1 may be designed in the form of a linearly moving member with a plain or rolling element bearing and will have coupling means of some sort, not marked in the drawing, for the part or parts that are to be driven. The output member 1 is guided on the slotted hollow section 3. As will become clear from the section of FIG. 3 taken on the line III—III of FIG. 2, the hollow section 3 in the present design is a square section tube. The hollow section 3 is the supporting or load bearing element of the linear drive whose overall size is largely dependent on the size of the section. The section takes up sideways forces transmitted by way of the drive output member to the system. Mounting plates 4 are best fixed on the ends of the hollow section 3 so that the linear drive may be mounted as desired. The driving spur 2 of the drive output member 1 is run through the slot in the hollow section 3 and is fixedly joined inside it to the stroke ratio changing transmission, that is of known design, and has as its main parts two pulleys 5, that are supported on a pulley support with a distance therebetween at least equal to the length of the stroke to be transmitted with a changed ratio, a cylinder 6 functioning as the pulley support in this respect. In fact the pulleys 5 are mounted on the sides of the cylinder 6 at its end plates 7 by way of fixed pins. However, to keep to the idea of the invention, the pulleys do not have to be mounted here and may be mounted at the ends on the cylinder end plates 7. Furthermore the transmission has a cord 8 trained round the pulleys and fixed on the one hand on the driving spur 2 and on the other hand to a mount 9 on the hollow section 3. In place of a cord it would however naturally be possible to have chains, steel bands, toothed belts or the like, here referred to as tractive element. In place of the pulleys it might further be possible to have fixed guides for roller chains. Such pulleys, guides or the like are here termed element guides. The moving cylinder 6 is guided axially on the inner face of the hollow section 3. A useful effect is produced if the cylinder end plates 7 are designed as plain bearings, for example on three sides. The piston rod 10 of the cylinder 6 has its end kept in position on a mount 11, which for its part is fixed to the mounting plate 4 on a side thereof facing toward the piston rod 10.

In FIG. 1 the linear drive will be seen with the piston rod extended from the cylinder. If the actuator cylinder 6 is acted upon by fluid under pressure, such fluid being supplied for example through a helically reinforced hose (not shown), the cylinder 6 will be moved into the position seen in FIG. 2 with the piston rod 10 taken up or retracted therein. A person trained in the art will be able to see at once that the stroke of the cylinder 6 is transmitted by the stroke ratio changing transmission with a ratio of 1 to 2 to the drive output member 1. The direction of motion may naturally be changed.

Figure 4:
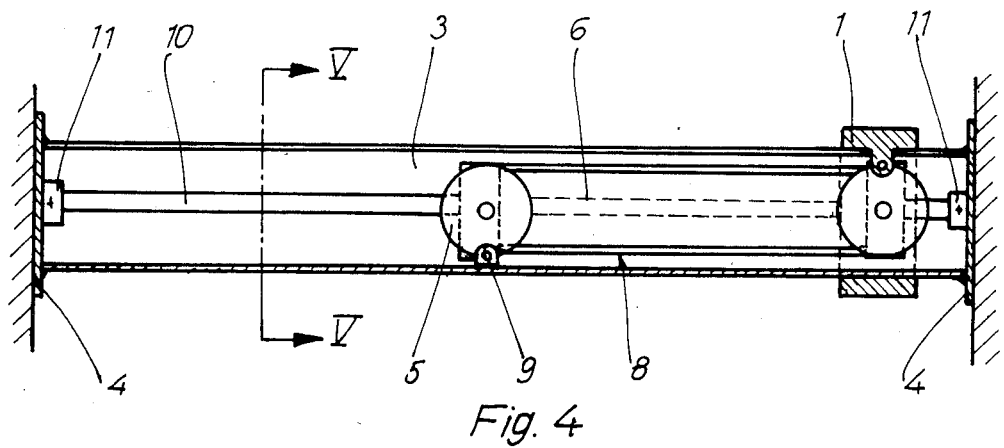
FIGS. 4 and 5 are diagrammatic views of a second working example of the linear drive with the piston rod fixed at both ends.
Figure 3:
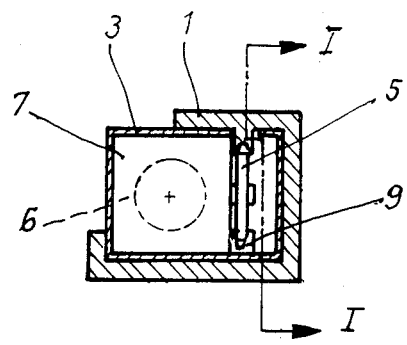
Figure 5:
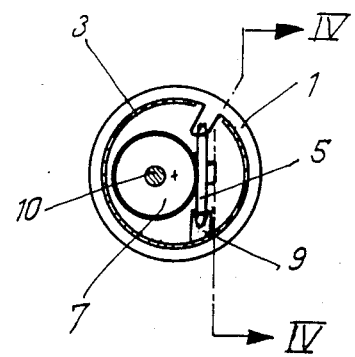

In FIGS. 4 and 5 equivalent parts are marked with the same part numbers as in FIGS. 1 to 3. Cylinder 6 acts as a liner within the housing and is guided by the piston rod which is fixed to the housing.

The form of linear drive seen in FIGS. 4 and 5 is mainly different to the first form of the invention in that the piston rod 10 is run all the way through the system, each end being fixed to a mount 11 joining it to the mounting plates 4. For this reason the piston rod 10 takes on the function of lengthways guide for the cylinder. It will be clear that the cylinder end plates 7 do not have to take over the function of plain bearings in the case of this form of the invention so that the quality of the inner surface of the hollow section 3 does not have to keep to any special conditions. A further point is that the hollow section 3 may take up very much heavier sideways forces than was the case with the first design without causing jamming in the bore of he cylinder 6.

The important design points of the linear drives of which an account have been given are the very compact form without any parts sticking out from it, its simple mechanical design, the high sideways forces that may be taken up and the fact that it is safeguarded against dirt.

Many different forms of the linear drive would be possible without giving up the idea of the invention. Herein one such possible design to be noted is one in which the actuator cylinder or for example the turning parts of the stroke ratio changing transmission would be used with known position sensing and speed controlling means, this opening up many fields of use for the linear drive, more specially in connection with materials handling.

Turning now to FIGS. 6 to 9 the reader will see working examples of the linear drive in keeping with the invention, to make clear design details thereof. Each view is a section taken on the lines III—III of FIG. 2 and V—V of FIG. 4. The forms to be seen may, as desired, be used with the piston rod fixed at two ends or only one end.

Figure 6:
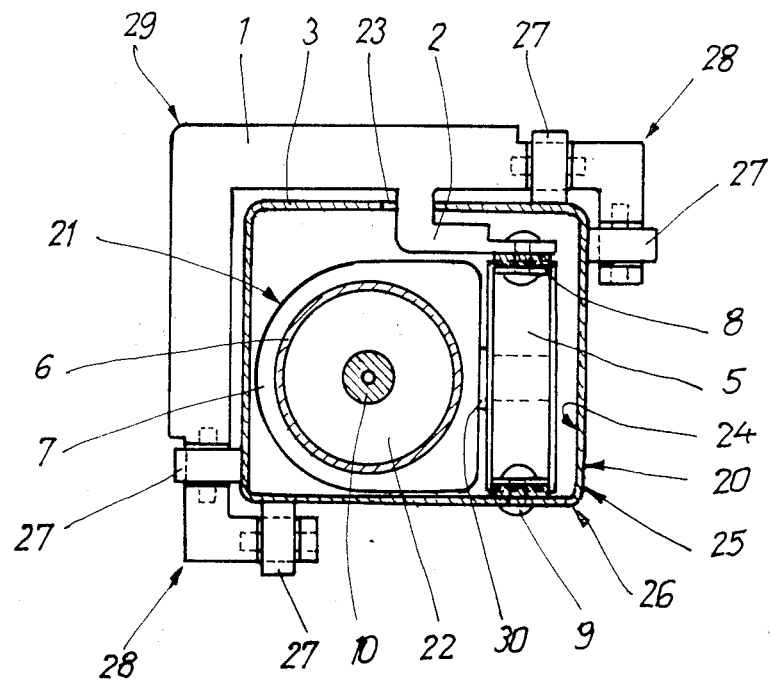
FIGS. 6 to 9 are detailed views of different working examples of the inventive drive in sectional view on the same lines as FIG. 3 or FIG. 5.

FIG. 6 is a view of a linear drive in keeping with the invention having a housing 20 with a hydraulic actuator cylinder therein, that is generally numbered 21. There is a piston 22 within the cylinder 6 of the actuator cylinder 21, such piston being mounted on a piston rod 10 and running sealingly in relation to the inner face of the cylinder 6. It is furthermore possible to see one of the two cylinder end plates 7 shutting off the actuator cylinder 21 at its two ends and walling off the space within the cylinder 21 together with the piston into two working spaces. The last-named are joined with a hydraulic or pneumatic driving fluid as may be desired for producing a driving motion of the piston 22 in relation to the cylinder 6. In place of a hydraulic or pneumatic actuator cylinder it would be possible to have an electric actuator with a threaded rod (acting as piston rod 10) turned by an electric motor within it, such rams being known as "electric rams". Thus an electric hydraulic or pneumatic linear actuator is provided, which has a driven rod. In any event the drive force produced is transmitted by way of a stroke ratio changing transmission to a linearly moving drive output member 1. One of the main ideas on which the present invention is based is that the piston rod 10 with the piston 22 is fixedly mounted in the housing 20, whereas the cylinder 6 is guided and mounted for motion in the direction of its length and has the stroke ratio changing transmission supported thereon.

The housing 20 in keeping with FIG. 6 is in the form of a piece of slotted hollow section, the slot thereof running in the direction of motion of the drive output member 1 along the full linear length of its stroke. There is a driving spur 2 running through the slot 23 to be joined to the stroke ratio changing transmission. The drive output member 1 is driven by the stroke ratio changing transmission and the driving spur 2, said member 1 being guided on the housing 20 so as to be moved along a straight line. In this respect such guiding effect may be produced by running on the outer side 25 of the housing 20 as in FIGS. 6 and 7 or as in FIG. 8 on the inner side 24 of the housing 20. It will furthermore be seen from FIG. 6 that the housing in the form of a hollow section has a square cross section. The drive output part 1 is a bridgepiece formed to match such square cross section and fitting around the housing on all outer faces thereof with play. For cutting down on friction of the output member 1, rolling bodies such a rollers or the like are present which in the present case are in the form of wheels 27. The wheels 27 are placed at two diagonally opposite corners 28 of the bridge-like member 1 and, out of line by 90° in relation to each other, are run on outer sides 25 of the housing 20. A third corner 29 of the bridge is on the other hand free of wheels and at the last corner of a long edge 26 of the housing 20 the bridge is open. Along the depth direction of the output member 1 at a right angle to the plane of FIG. 6 there are a number of wheels 27 that are placed in line with each other, this stopping the member 1 from being rocked. It will be seen that in the system noted here, one may be certain of the member 1 being guided quite positively and with little friction on the outer side or surface 25 of the housing 20.

In FIG. 6 it is furthermore possible to see one of the pulleys 5 of the stroke ratio changing transmission. The pulleys are mounted with a fixed distance from each other on the cylinder 6 of the actuator cylinder 21 and are seated on pins 30 running at a right angle to the lengthways direction of the cylinder, that is to say, to the direction of motion of the drive output member 1. The pins 30 for their part are mounted on the end plates 7 of the cylinder for shutting off the two ends of the cylinder 6. A tractive element, more specially in the form of a cord 8, is trained over the pulleys 5, and is joined not only with the housing 20 but furthermore with the output member 1. The mount 9 is used in this respect for assembly of the housing 20 and the connection with the member 1 by way of the driving spur 2. As will be seen from FIG. 6 the pulleys 5 with the tractive element 8 are placed in a part of the housing 20 near its edge and on the actuator cylinder 21; on the other hand the slot 23 for the spur 2 is best placed generally in the middle on one of the faces of the housing 20. For this reason the driving spur 2 is angled for joining it with the tractive element 8 and is furthermore stepped back at its end which is used for fixing. The stroke ratio changing transmission has only one pair of pulleys 5, placed to the side of the actuator cylinder 21, with their cord 8, with which the driving spur 2, that is bent over to one side, is joined. Because the stroke ratio changing transmission is placed off center and asymmetrically, sideways forces are produced in operation, but in most cases they may be taken up without any trouble by the hollow section of the housing 20.

It is only in the case of specially heavy forces having to be taken care of, which are more specially likely on hydraulic operation, that a double stroke ratio changing transmission may give useful effects. As may be seen from FIG. 7 one pair of pulleys 5 is then placed on each side of the actuator cylinder 21, each such pair having a cord 8 trained round it. The pairs of pulleys 5 are placed symmetrically on opposite sides of the actuator cylinder 21. The two cords 8 are in each case fixedly joined to the housing 20 by way of mounts 9 and the drive output member 1 is joined up with the two cords 8 using a T-like driving spur 2 with its arms running out past the actuator cylinder 21 on both sides at a higher level than the stroke ratio changing transmission to be joined with the cords 8 in some way. The stem 31 of the T-like driving spur 2 is again designed to run out through a slot 23 in the housing 20 and is molded onto the drive output member 1, that is guided along the outer side 25 of the housing 20. Once again wheels 27 are used for guiding, but they are placed somewhat differently to the system used in the working example noted earlier.

The drive output member as in FIG. 7 again is formed like a bridge but it is however open on the side opposite the driving spur 2. The opening 32 of the bridge is generally in the middle in relation to the housing 20. On the two sides of the bridge opening 32 there is a pair of wheels 33, the pins supporting the wheels 27 being in line. A like pair of wheels 34 is placed to the opposite side on the two sides of the driving spur 2. On the other hand on each cross or short side of the member 1 there is only one single wheel 27, although it is to be noted that for each wheel 27 in the figure it would be possible to have a complete line of wheels 27 spaced out in the depth direction of the member 1, such wheels then running on the outer side or surface 25 of the housing 20 at points that are symmetrically opposite to each other. In this way it is possible to get a specially firm guiding effect, bearing up to the sideways forces of the stroke ratio changing transmission, of the member 1. Furthermore doubling the stroke ratio changing transmission so that then there is one of them on each side of the actuator cylinder 21 is responsible for such sideways forces being balanced in part and for the loading of all the components being small. This is naturally more specially true for the two cords 8, that when the actuator cylinder 21 is worked, each take up roughly half the pulling forces.

Figure 7:
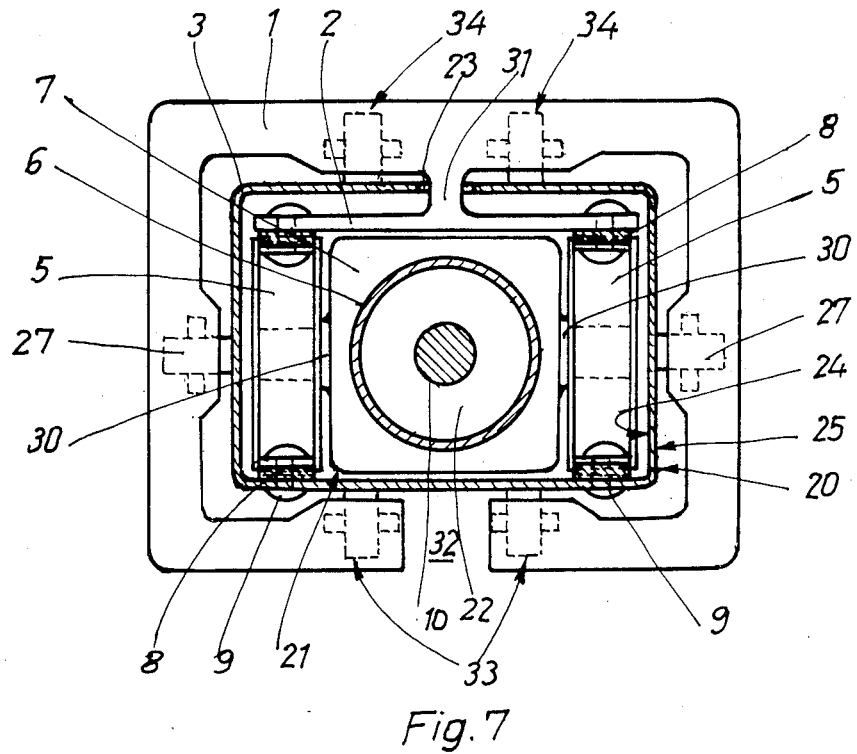

In the working example of the invention to be seen in FIG. 7 the support pins 30 for the pulleys 5 are placed in line on the two sides of the cylinder end plates 7. As was the case in FIG. 6 as well, the cylinder end plates 7 are clear of the inner face of 24 of the housing 20 and generally there is a space between it and other parts of the linear drive outside the actuator cylinder 21. The same is true for the cylinder 6 of the actuator cylinder 21 itself; the cylinder 6 is, together with the cylinder end plates 7, able to be moved along in a spaced position from the inner faces 24 of the housing 20. The motion is produced when the actuator cylinder 21 is moved along the piston rod 10. The cylinder 6 is in this respect only guided on the piston 22. As was noted, in this system it is best for the piston rod to be firmly supported at the two ends of the housing 20.

Figure 8:
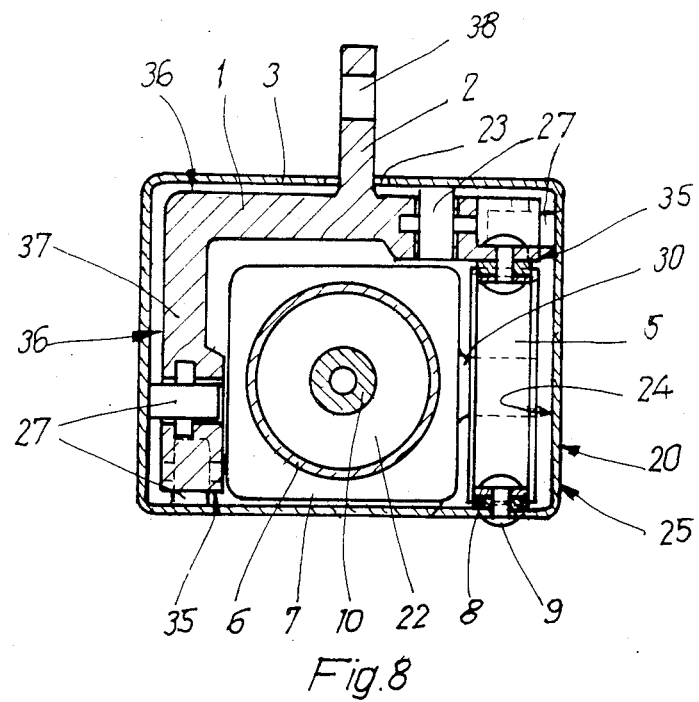

FIG. 8 is a view of a further form of the linear drive in keeping with the invention in which the drive output member 1 is guided inside the housing 20, with only the driving spur running from the member 1 through the slot 23 in the housing 20 in an outward direction; all the other parts of the linear drive are on the other hand united inside the housing 20. This very compact and encased form of the system gives the best possible safeguard against the effect of dirt or strong chemicals. The housing 20 is in this form of the invention again made with a rectangular outline and there is one stroke ratio changing transmission with a single pair of pulleys 5 placed on the side of an actuator cylinder 21. It is however to be noted that this system does not have to be used for the inner guiding of the drive output member 1. More specially it would be possible to have for this purpose a round housing 20 and/or a stroke ratio changing transmission having twice as many pulleys placed on the two sides of the actuator cylinder 21 (this not being marked in the figure). In keeping with the rectangular outline of the housing 20, the output member 1 has a largely L-like form. At each of the end faces 35 of the L-section and at outer faces 36 of the L-like leg 37 there are wheels 27 running on inner sides 24 of housing 20. In this case drive output member 1 is made with such a size that it may be fitted with play at an angle into the housing 20 so that its wheels 27 come to rest only on the inner faces 24 of the rectangular hollow section. It is however to be made clear that again in place of each of the wheels 27 marked, it would be possible to have a complete row of spaced wheels 27 put in line with each other in the direction of viewing the figure in the depth direction of the drive output member 1, such wheels furthermore stopping the member 1 from being rocked in the housing 20, one of the L-like legs 37 running out to a point over the stroke ratio changing transmission to be joined with the tractive element 8 therefor, that as well is joined at 9 to the housing 20. The actuator cylinder 21 together with the stroke ratio changing transmission is taken up in the L-like opening of the member 1. The cylinder 6 of the actuator cylinder 21 is designed to run with play not only in relation to the housing 20 but furthermore to the drive output member 1. To this end the cylinder 6 is again only mounted on the fixed piston 22 so that it may be moved in relation thereto. The linear forward motion produced from the motion of the cylinder 6, of the drive output member 1, may be transmitted to a very wide range of different elements that are to be moved. To this end the driving spur running out of the housing 20 has one or more holes 38 for connection thereof to such elements by using a part as for example a screw fitting in such hole.

Figure 9:
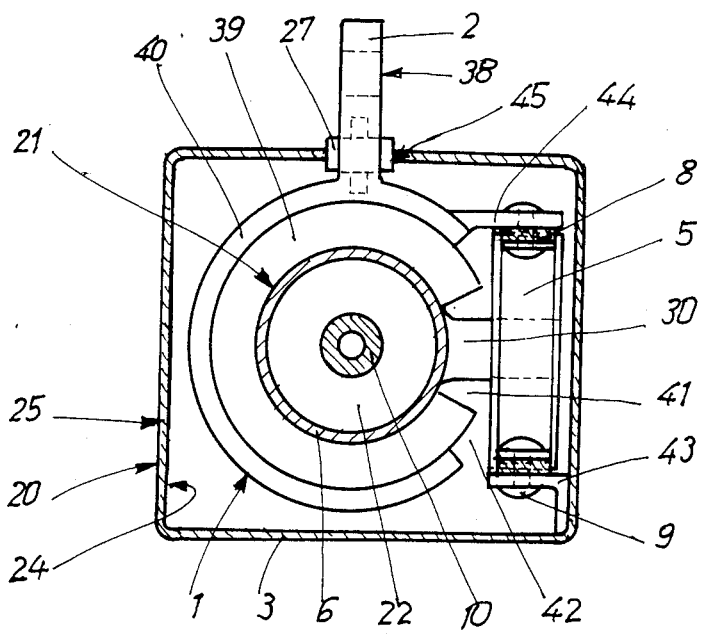

Lastly FIG. 9 is a view of a further possible form of the way of mounting the drive output member 1. The member 1 is guided not only on the housing 20 but furthermore on the cylinder 6 of the actuator cylinder 21. The actuator cylinder 21 has a round cross section and the output member 1 has a slotted spherical bushing rolling along the cylinder 6 of the actuator cylinder 21. The output part 1 has a segmented ring 40 fitted out the spherical bushing 39, the slotted part 41 of the spherical bushing 39 and the part 42 of the ring 40 being placed one on top of the other. The segment design is necessary to make it possible for the pulleys 5 of the stroke ratio changing transmission to be fixed on the cylinder 6. The bearing pins 30 of the pulleys 5 are placed in the slotted part 41 of the spherical bushing 39 on the cylinder 6 of the actuator cylinder 21. Again there is a cord 8 trained over the pulleys 5, such cord being firmly joined with the housing 20 by way of a bracket 43. There is a further connection between the cord 8 and the output member 1 by way of a support 44, that is mounted on the ring 40 and which is placed to run over the stroke ratio changing transmission. Furthermore a driving spur 2 is formed on the ring 40, such driving spur running through a slot 23 from the housing 20. To make certain that the member 1 is not twisted on the spherical bushing 39, the driving spur 2 has at least one wheel 27 running along on a rail; in keeping with a simpler design it is possible for the wheel 29 to be run on the side edges 45 of the slot 23 with the driving spur 2 running therethrough.

Although the linear drives, in keeping with FIGS. 6 to 9, are all so designed that the cylinder 6 is guided by the piston 22 on the piston rod 10, designs very much like this may be used as well if one or more of the inner faces 24 of the housing 20 are designed as a guide face for the cylinder 6. It is advantageous in this case that the end plates 7 shutting off the cylinder 6 at its two ends may take the form of plain bearings or shoes running along the guide face. Further it is not necessary for the housing 20 to have a rectangular hollow cross section, at least for a part of the different designs noted so far. The hollow section may have a cylindrical form with a ring-like output member matching it, running along the inner or outer face thereof. This system is to be seen diagrammatically in FIG. 3.

In its different forms the present invention makes possible a precisely functioning linear drive, the guide faces having to be made of material with a tight specification only have to be present along half the stroke of the linear drive. Because the stroke ratio changing transmission is placed on a moving cylinder 6 while the piston 22 is fixed in position, the linear drive of the present invention may be designed to be very small in size. It is possible for the pulleys 5 of the stroke ratio changing transmission to be placed at some distance on the cylinder 6, such distance being equal to the stroke of the piston of the actuator cylinder 21. The resulting overall length of the unit will then, if at all, be only a little longer that the stroke of the drive output member. In a design with the piston rod 10 joined to the two ends of the housing 20 the cylinder 6, the supporting of the stroke ratio changing transmission, will be in the best possible way at every position. Even when a force is acting eccentrically on the cylinder 6 by way of a stroke ratio changing transmission placed to one side, this force may be taken up by the piston rod 10 without any trouble. The preferred system with a piston rod running all the way through and supported at its two ends lastly is responsible for the very useful effect that the force on a forward motion is equal to the force on a backward motion.

I claim:

1. A linear drive comprising:
   a housing;
   a linear actuator having a fixed driven rod and a liner guided for movement in a path with respect to said housing on said driven rod, said driven rod having at least one end outside to said liner fixedly connected to said housing;
   a stroke ratio change transmission connected to said liner and movable with said liner along said path; and
   an output member connected to said transmission and moveably mounted with respect to said housing for movement along said housing with movement of said liner along said path.

2. A linear drive according to claim 1 wherein said housing comprises a hollow tubular section having a slot extending in a direction of movement of said output member, said output member mounted for linear movement along one of an inner and an outer surface of said tubular section, said linear actuator with liner, driven rod and transmission mounted in said tubular section, and a driving spur connected to said output member and extending through said slot for linear movement along said slot with movement of said output member.

3. A linear drive according to claim 2 wherein said liner is mounted for sliding against at least one inner surface of said tubular section.

4. A linear drive according to claim 3 including an end plate connected to each end of said liner, said liner comprising a cylinder, each end plate closing off an end of said cylinder, each end plate comprising a plain bearing for sliding along and being guided by the inner surface of said tubular section.

5. A linear drive according to claim 1 wherein said driven rod extends from only one end of said liner in a direction parallel to said path, said driven rod being connected to said housing only at one end of said driven rod.

6. A linear drive according to claim 1 wherein said driven rod extends through said liner, said driven rod having opposite ends outside said liner both of which are connected to said housing.

7. A linear drive according to claim 6 wherein said liner is spaced inwardly of an inner wall of said housing, said liner being guided along said path by said driven rod.

8. A linear drive according to claim 1 wherein said stroke ratio changing transmission comprises a first pulley connected to said liner at one end thereof, a second pulley connected to said liner at an opposite end thereof, a tractive element entrained around said first and second pulleys, said tractive element connected to said housing at a first point of said liner tractive element and connected to said output member at a second point on said tractive element spaced from said first point.

9. A linear drive according to claim 8 wherein said liner comprises a cylinder, a pair of end plates connected to opposite ends of said cylinder, and a pin in each end plate for rotatably receiving said first and second pulleys respectively, each of said pins extending perpendicular to said path.

10. A linear drive according to claim 8 wherein said transmission comprises an additional first pulley connected at one end of said linear actuator and an additional second pulley connected at the opposite end of said liner, a second tractive element entrained around said additional first and second pulleys, said additional tractive element being connected to said housing at a first point thereof and being connected to said output member at a second point thereof spaced from said first point of said second tractive element, said housing comprising a tubular section having a slot therein, a T-shaped driven spur connected to each of said first and second tractive elements at said second points thereof and extending through said slot, said output member slidably mounted on said tubular section and connected to a portion of said spur extending through said slot.

11. A linear drive according to claim 1 wherein said housing has a circular cross section, said output member slidably riding on one of an inner and outer surface of said housing.

12. A linear drive according to claim 1 wherein said housing has a rectangular cross section, said output member sliding on one of an inner and outer surface of said housing.

13. A linear drive according to claim 12 wherein said output member extends at least partly around said housing, said housing having a plurality of outer faces, said output member engaging at least a portion of each of said outer faces for linear movement along the length of said housing.

14. A linear drive according to claim 13 wherein said output member includes a plurality of wheels rotatably mounted thereto and rolling against said outer faces of said housing, said wheels mounted on said output member at opposite corners of said housing.

15. A linear drive according to claim 13 wherein said output member extends around said rectangular cross sectioned housing except for a gap area, said housing having a slot on a side thereof opposite said gap area, a spur connected between said transmission and said output member and moveable along and in said slot, a plurality of wheels rotatably mounted to said output member and rolling against outer faces of said housing, there being at least one wheel on each side of said slot and one wheel on each side of said gap area.

16. A linear drive according to claim 12 wherein said output member is mounted for movement in said housing and has an L-shaped form having two legs at least one wheel rotatably mounted to each leg and rollable against an inner surface of said housing, said liner being disposed between said legs.

17. A linear drive according to claim 1 wherein said liner comprises a cylinder having circular cross section, said output member comprising an open ring and a slotted spherical bushing rollably mounted between said cylinder and said open ring.

18. A linear drive according to claim 17 wherein said transmission comprises a pin connected to said cylinder at each end thereof extending substantially perpendicular to said path, a pulley rotatably mounted on each pin and a tractive element entrained around each pulley, each pin extending in a slot area of said slotted spherical bushing and an opening of said open ring.

19. A linear drive according to claim 17 wherein said housing comprises a tubular section with a slot, said output member having a spur extending through said slot and moveable along said slot and at least one wheel rotatably mounted to said output member and engaged against said slot for preventing relative rotation of said output member with respect to said cylinder.

* * * * *